United States Patent
Dearment et al.

(10) Patent No.: US 10,735,429 B2
(45) Date of Patent: *Aug. 4, 2020

(54) CONTROLLING USER CREATION OF DATA RESOURCES ON A DATA PROCESSING PLATFORM

(71) Applicant: Palantir Technologies Inc., Palo Alto, CA (US)

(72) Inventors: Greg Dearment, Palo Alto, CA (US); Adam Anderson, Palo Alto, CA (US); Andrew Bradshaw, Palo Alto, CA (US); Bradley Moylan, Palo Alto, CA (US); Jason Zhao, Palo Alto, CA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,900

(22) Filed: Jun. 4, 2019

(65) Prior Publication Data
US 2019/0289009 A1    Sep. 19, 2019

Related U.S. Application Data

(63) Continuation of application No. 16/134,586, filed on Sep. 18, 2018, now Pat. No. 10,397,229, which is a
(Continued)

(30) Foreign Application Priority Data

Oct. 4, 2017   (GB) .................................... 1716170.4
Oct. 18, 2017  (EP) ..................................... 17197000

(51) Int. Cl.
*H04L 29/06*     (2006.01)
*G06F 9/46*      (2006.01)
*G06F 9/50*      (2006.01)

(52) U.S. Cl.
CPC ............... *H04L 63/10* (2013.01); *G06F 9/46* (2013.01); *G06F 9/468* (2013.01); *G06F 9/50* (2013.01);
(Continued)

(58) Field of Classification Search
CPC ........................... H04L 63/10; H04L 63/0823
See application file for complete search history.

(56) References Cited

U.S. PATENT DOCUMENTS

| 5,978,475 A | 11/1999 | Schneier et al. |
| 6,253,203 B1 | 6/2001 | O'Flaherty et al. |

(Continued)

FOREIGN PATENT DOCUMENTS

| CN | 101729531 | 6/2010 |
| CN | 103281301 | 9/2013 |

(Continued)

OTHER PUBLICATIONS

U.S. Appl. No. 16/134,586, filed Sep. 18, 2018, First Office Action Interview, dated Mar. 8, 2019.
(Continued)

*Primary Examiner* — Ali Shayanfar
(74) *Attorney, Agent, or Firm* — Hickman Palermo Becker Bingham LLP

(57) ABSTRACT

Methods and systems are disclosed for controlling user creation of data resources on a software platform for storing and executing data resources for multiple users. The methods and systems may be performed using one or more processors or special-purpose computing hardware and may comprise receiving from a user a user request to create a data resource on the software platform, the user request comprising, or identifying, a specification indicative of the data resource and a user identifier associated with said user. A further operation may comprise performing verification of
(Continued)

said user using the user identifier to determine if said user is permitted to create or modify the data resource indicated in the specification in accordance with a predetermined set of permissions. A further operation may comprise, responsive to verifying said user in accordance with the predetermined set of permissions, creating a version the data resource indicated in accordance with the specification for deployment on the software platform for subsequent access or execution by said user.

18 Claims, 8 Drawing Sheets

Related U.S. Application Data continuation of application No. 15/826,321, filed on Nov. 29, 2017, now Pat. No. 10,079,832.

(52) U.S. Cl.
CPC .......... *G06F 9/5061* (2013.01); *G06F 9/5072* (2013.01); *H04L 63/0823* (2013.01); *H04L 63/101* (2013.01); *G06F 9/5027* (2013.01); *H04L 63/168* (2013.01)

(56) References Cited

U.S. PATENT DOCUMENTS

| | | | |
|---|---|---|---|
| 6,725,240 B1 | 4/2004 | Asad et al. | |
| 6,807,569 B1 | 10/2004 | Bhimani et al. | |
| 7,017,046 B2 | 3/2006 | Doyle et al. | |
| 7,069,586 B1 | 6/2006 | Winneg et al. | |
| 7,225,468 B2 | 5/2007 | Waisman et al. | |
| 7,596,285 B2 | 9/2009 | Brown et al. | |
| 7,705,564 B2* | 4/2010 | Atehortua | G01R 31/379 320/132 |
| 7,770,032 B2 | 8/2010 | Nesta et al. | |
| 7,801,871 B2 | 9/2010 | Gosnell | |
| 7,962,495 B2 | 6/2011 | Jain et al. | |
| 8,141,036 B2* | 3/2012 | Wagner | G06F 8/33 715/230 |
| 8,181,253 B1 | 5/2012 | Zaitsev et al. | |
| 8,190,893 B2 | 5/2012 | Benson et al. | |
| 8,196,184 B2 | 6/2012 | Amirov et al. | |
| 8,239,668 B1 | 8/2012 | Chen et al. | |
| 8,301,904 B1 | 10/2012 | Gryaznov | |
| 8,312,546 B2 | 11/2012 | Alme | |
| 8,392,902 B2* | 3/2013 | Reinz | G16H 40/40 717/168 |
| 8,646,080 B2 | 2/2014 | Williamson et al. | |
| 8,667,456 B1* | 3/2014 | Czymontek | G06F 8/315 717/100 |
| 8,683,322 B1 | 3/2014 | Cooper | |
| 8,726,379 B1 | 5/2014 | Stiansen et al. | |
| 8,769,412 B2 | 7/2014 | Gill et al. | |
| 8,782,794 B2 | 7/2014 | Ramcharran | |
| 8,931,043 B2 | 1/2015 | Cooper et al. | |
| 9,021,260 B1 | 4/2015 | Falk et al. | |
| 9,049,117 B1 | 6/2015 | Nucci et al. | |
| 9,100,428 B1 | 8/2015 | Visbal | |
| 9,335,897 B2 | 5/2016 | Goldenberg | |
| 9,338,013 B2 | 5/2016 | Castellucci et al. | |
| 9,514,327 B2* | 12/2016 | Ford | G06F 16/93 |
| 9,721,117 B2 | 8/2017 | Pleau | |
| 9,910,655 B1* | 3/2018 | Ranganathan | G06F 8/61 |
| 10,089,089 B2* | 10/2018 | Krishnamoorthi | G06F 8/437 |
| 2002/0112157 A1 | 8/2002 | Doyle et al. | |
| 2004/0073814 A1* | 4/2004 | Miyazaki | H04L 9/3255 726/6 |
| 2004/0123139 A1 | 6/2004 | Aiello et al. | |
| 2004/0153418 A1 | 8/2004 | Hanweck | |
| 2004/0250124 A1 | 12/2004 | Chesla et al. | |
| 2005/0038788 A1* | 2/2005 | Dettinger | G06F 21/6227 |
| 2005/0157662 A1 | 7/2005 | Bingham et al. | |
| 2005/0229256 A2 | 10/2005 | Banzhof | |
| 2005/0262556 A1 | 11/2005 | Waisman et al. | |
| 2005/0275638 A1 | 12/2005 | Kolmykov-Zotov et al. | |
| 2006/0031928 A1 | 2/2006 | Conley et al. | |
| 2006/0069912 A1 | 3/2006 | Zheng et al. | |
| 2006/0179003 A1 | 8/2006 | Steele et al. | |
| 2006/0212931 A1 | 9/2006 | Shull et al. | |
| 2006/0218637 A1 | 9/2006 | Thomas et al. | |
| 2006/0265747 A1 | 11/2006 | Judge | |
| 2007/0074204 A1* | 3/2007 | Curtis | G06F 8/65 717/174 |
| 2007/0143851 A1 | 6/2007 | Nicodemus | |
| 2007/0294766 A1 | 12/2007 | Mir et al. | |
| 2008/0104407 A1 | 5/2008 | Horne et al. | |
| 2008/0201580 A1 | 8/2008 | Savitzky et al. | |
| 2008/0222706 A1 | 9/2008 | Renaud et al. | |
| 2008/0229422 A1 | 9/2008 | Hudis et al. | |
| 2009/0103442 A1 | 4/2009 | Douville | |
| 2009/0169020 A1* | 7/2009 | Sakthikumar | G06F 21/80 380/278 |
| 2009/0228701 A1 | 9/2009 | Lin | |
| 2009/0328222 A1 | 12/2009 | Heiman et al. | |
| 2010/0077481 A1 | 3/2010 | Polyakov et al. | |
| 2010/0100963 A1 | 4/2010 | Mahaffey | |
| 2010/0179831 A1 | 7/2010 | Brown et al. | |
| 2010/0235915 A1 | 9/2010 | Memon et al. | |
| 2010/0262688 A1 | 10/2010 | Hussain et al. | |
| 2010/0309510 A1* | 12/2010 | Hansen | G06F 3/1288 358/1.15 |
| 2010/0325159 A1* | 12/2010 | Wright | H04L 63/102 707/783 |
| 2010/0330801 A1 | 12/2010 | Rouh | |
| 2011/0060910 A1 | 3/2011 | Gormish et al. | |
| 2011/0126127 A1 | 5/2011 | Mariotti | |
| 2011/0202555 A1 | 8/2011 | Cordover et al. | |
| 2011/0219450 A1 | 9/2011 | McDougal et al. | |
| 2012/0079592 A1 | 3/2012 | Pandrangi | |
| 2012/0084866 A1 | 4/2012 | Stolfo | |
| 2012/0110633 A1 | 5/2012 | An et al. | |
| 2012/0110674 A1 | 5/2012 | Belani et al. | |
| 2012/0169593 A1 | 7/2012 | Mak et al. | |
| 2012/0218305 A1 | 8/2012 | Patterson et al. | |
| 2012/0254129 A1 | 10/2012 | Wheeler et al. | |
| 2012/0284791 A1 | 11/2012 | Miller et al. | |
| 2012/0330801 A1 | 12/2012 | McDougal et al. | |
| 2013/0019306 A1 | 1/2013 | Lagar-Cavilla et al. | |
| 2013/0097709 A1 | 4/2013 | Basavapatna et al. | |
| 2013/0110876 A1 | 5/2013 | Meijer et al. | |
| 2013/0139268 A1 | 5/2013 | An et al. | |
| 2013/0211911 A1 | 8/2013 | Krietzman | |
| 2013/0239217 A1 | 9/2013 | Kindler et al. | |
| 2013/0247142 A1* | 9/2013 | Nishizawa | G06F 21/604 726/1 |
| 2013/0247412 A1 | 9/2013 | Nishizawa | |
| 2013/0262155 A1* | 10/2013 | Hinkamp | G06Q 40/08 705/4 |
| 2013/0318589 A1* | 11/2013 | Ford | H04L 63/0428 726/7 |
| 2014/0013451 A1 | 1/2014 | Kulka et al. | |
| 2014/0059683 A1 | 2/2014 | Ashley | |
| 2014/0105039 A1* | 4/2014 | McDysan | H04L 45/02 370/252 |
| 2014/0123279 A1 | 5/2014 | Bishop et al. | |
| 2014/0129550 A1* | 5/2014 | Weatherhead | G06F 16/00 707/723 |
| 2014/0143009 A1 | 5/2014 | Brice et al. | |
| 2014/0165038 A1* | 6/2014 | Kaler | G06F 8/75 717/123 |
| 2014/0173712 A1 | 6/2014 | Ferdinand | |
| 2014/0173738 A1 | 6/2014 | Condry et al. | |
| 2014/0188612 A1* | 7/2014 | Chou | G06Q 30/0257 705/14.55 |
| 2014/0188815 A1* | 7/2014 | Mentz | G06Q 10/06 707/689 |
| 2014/0188895 A1 | 7/2014 | Wang et al. | |

(56) References Cited

U.S. PATENT DOCUMENTS

| | | | |
|---|---|---|---|
| 2014/0229422 | A1 | 8/2014 | Jain et al. |
| 2014/0283107 | A1 | 9/2014 | Walton et al. |
| 2014/0366132 | A1 | 12/2014 | Stiansen et al. |
| 2015/0039565 | A1 | 2/2015 | Lucas |
| 2015/0128274 | A1 | 5/2015 | Giokas |
| 2015/0134600 | A1* | 5/2015 | Eisner ............... G06F 16/93 707/608 |
| 2015/0135300 | A1* | 5/2015 | Ford ............... H04L 63/0281 726/11 |
| 2015/0188715 | A1 | 7/2015 | Castelluci et al. |
| 2015/0200948 | A1* | 7/2015 | Cairns ............... H04L 9/3213 726/4 |
| 2015/0229664 | A1 | 8/2015 | Hawthorn et al. |
| 2015/0248563 | A1 | 9/2015 | Alfarano et al. |
| 2015/0261847 | A1 | 9/2015 | Ducott et al. |
| 2015/0278311 | A1* | 10/2015 | Isherwood ........ G06F 16/24573 707/741 |
| 2015/0286665 | A1* | 10/2015 | Nyman ............. G06F 16/24573 707/737 |
| 2015/0312188 | A1* | 10/2015 | White ............... H04L 51/046 709/204 |
| 2015/0326601 | A1 | 11/2015 | Grondin et al. |
| 2015/0363374 | A1* | 12/2015 | Lees ............... G06F 8/73 715/256 |
| 2016/0004864 | A1 | 1/2016 | Falk et al. |
| 2016/0028759 | A1 | 1/2016 | Visbal |
| 2016/0182309 | A1* | 6/2016 | Maturana ............ H04L 41/145 709/224 |
| 2017/0091466 | A1* | 3/2017 | Meyer ............... H04W 12/08 |
| 2017/0185715 | A9* | 6/2017 | Smith ............... G16H 10/40 |
| 2017/0192986 | A1* | 7/2017 | Isherwood .......... G06F 16/9558 |
| 2017/0323117 | A1* | 11/2017 | Pleau ............... G06F 21/6236 |
| 2018/0024975 | A1* | 1/2018 | Ramakrishnan ...... G06F 40/169 715/230 |
| 2018/0046391 | A1* | 2/2018 | Saint-Hilaire ........ G06F 1/3287 |
| 2019/0104125 | A1 | 4/2019 | Dearment |

FOREIGN PATENT DOCUMENTS

| | | |
|---|---|---|
| EP | 1962222 | 8/2008 |
| EP | 2892197 | 7/2015 |
| EP | 2897051 | 7/2015 |
| EP | 2963578 | 1/2016 |
| EP | 2985974 | 2/2016 |
| EP | 3188069 | 7/2017 |
| NL | 2011642 | 8/2015 |
| WO | WO 2005/010685 | 2/2005 |

OTHER PUBLICATIONS

U.S. Appl. No. 16/134,586, filed Sep. 18, 2018, First Office Action Interview, dated Mar. 19, 2019.
U.S. Appl. No. 16/134,586, filed Sep. 18, 2018, Notice of Allowance, dated Apr. 17, 2019.
VirusTotal—About, <http://www.virustotal.com/en/about/> Printed Jun. 30, 2014 in 8 pages.
Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.
Crosby et al., "Efficient Data Structures for Tamper-Evident Logging," Department of Computer Science, Rice University, 2009, pp. 17.
Ma et al., "A New Approach to Secure Logging," ACM Transactions on Storage, vol. 5, No. 1, Article 2, Published Mar. 2009, 21 pages.
Glaab et al., "EnrichNet: Network-Based Gene Set Enrichment Analysis," Bioinformatics 28.18 (2012): pp. i451-i457.
FireEye, <http://www.fireeye.com/> Printed Jun. 30, 2014 in 2 pages.
Lee et al., "A Data Mining and CIDF Based Approach for Detecting Novel and Distributed Intrusions," Lecture Notes in Computer Science, vol. 1907 Nov. 11, 2000, pp. 49-65.
Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.
FireEye—Products and Solutions Overview, <http://www.fireeye.com/products-and-solutions> Printed Jun. 30, 2014 in 3 pages.
Bhuyan et al., "Network Anomaly Detection: Methods, Systems and Tools," First Quarter 2014, IEEE.
Baker et al., "The Development of a Common Enumeration of Vulnerabilities and Exposures," Presented at the Second International Workshop on Recent Advances in Intrusion Detection, Sep. 7-9, 1999, pp. 35.
Hur et al., "SciMiner: web-based literature mining tool for target identification and functional enrichment analysis," Bioinformatics 25.6 (2009): pp. 838-840.
Waters et al., "Building an Encrypted and Searchable Audit Log," Published Jan. 9, 2004, 11 pages, http://www.parc.com/content/attachments/building_encrypted_searchable_5059_parc.pdf.
Zheng et al., "GOEAST: a web-based software toolkit for Gene Ontology enrichment analysis," Nucleic acids research 36.suppl 2 (2008): pp. W385-W363.
European Patent Office, "Search Report" in application No. 17197000.7-1221, dated Mar. 8, 2018, 8 pages.

* cited by examiner

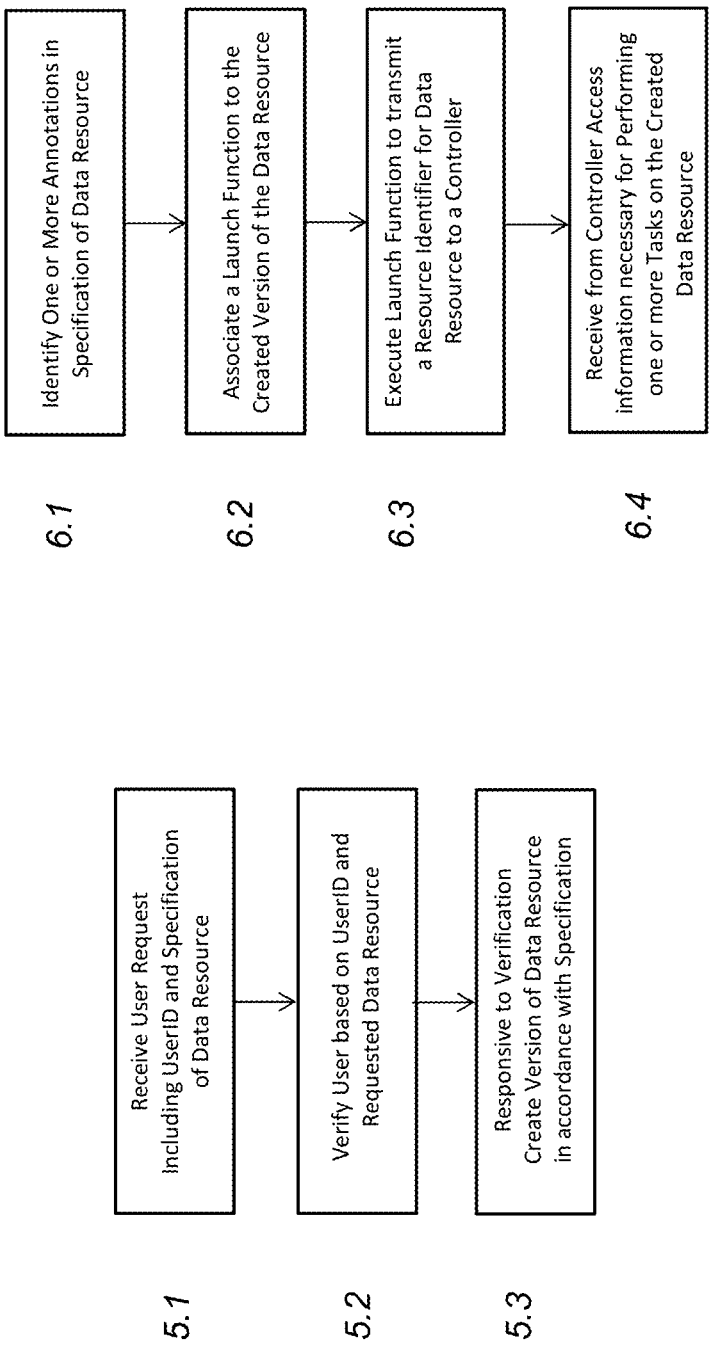

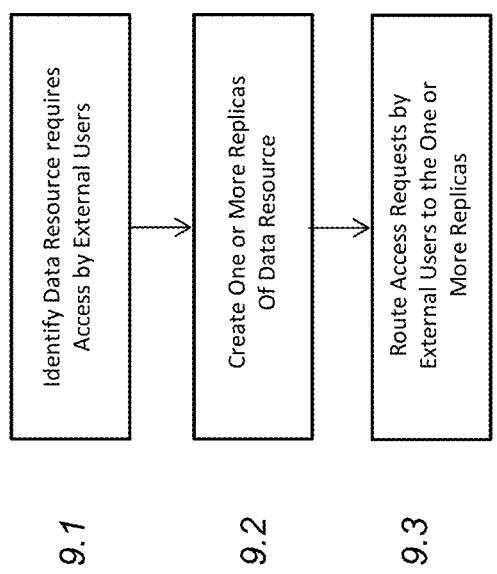

CONTROLLING USER CREATION OF DATA RESOURCES ON A DATA PROCESSING PLATFORM

BENEFIT CLAIM

The present application claims the benefit under 35 U.S.C. § 120 as a continuation of U.S. Non-Provisional application Ser. No. 16/134,586, filed Sep. 18, 2018, which claims the benefit under 35 U.S.C. § 120 as a continuation of U.S. Non-Provisional application Ser. No. 15/826,321, filed Nov. 29, 2017, the entire contents of both of which are incorporated by reference as if fully set forth herein. The applicants hereby rescind any disclaimer of claim scope in the parent applications or the prosecution history thereof and advise the USPTO that the claims in this application may be broader than any claim in the parent applications.

FIELD OF THE DISCLOSURE

The present disclosure relates to a method and systems for controlling user creation of data resources on a data processing platform, for example a cloud-based data processing platform storing and executing multiple data resources for multiple users.

BACKGROUND

Cloud computing is a computing infrastructure for enabling ubiquitous access to shared pools of servers, storage, computer networks, applications and data resources, which can be rapidly provisioned, often over the Internet.

A data resource in this context is any form of executable software or data structure, usually but not exclusively for providing a service, for example a data analysis application, a data transformation application, a report generating application, a machine learning process, a spreadsheet or a database.

Some companies provide cloud computing services for registered customers, for example manufacturing and technology companies, to create, store, manage and execute their own data resources. Sometimes, these data resources may interact with other software resources, for example those provided by the cloud platform provider.

For example, an engine manufacturer may create and store a database relating to spare parts for the different models of engines it produces and services. The database may, for example, be a multi-dimensional relational database. The engine manufacturer may also create one or more data analysis applications for performing certain tasks on data held in the database, for example to analyse and/or transform the data in order to identify trends which may be useful for predicting when certain parts will fail and/or need replacing, and hence when to produce and deploy the spare parts.

Proprietary or open-source software platforms used for such applications can be limited in terms of robustness and security, which can be problematic given that multiple different organisations may be storing and executing their own data resources on the same platform. There is a concern, for example, that data resources belonging to one organisation may impact data resources belonging to another organisation. Within a particular organisation, users who, having passed an initial layer of security provided by the platform, may be able to modify data resources when this was not the intention.

SUMMARY

A first aspect provides a method of controlling user creation of data resources on a software platform for storing and executing data resources for multiple users, wherein the method is performed using one or more processors or special-purpose computing hardware, the method comprising: receiving from a user a user request to create a data resource on the software platform, the user request comprising, or identifying, a specification indicative of the data resource and a user identifier associated with said external user; performing verification of said user using the user identifier to determine if said user is permitted to create or modify the data resource indicated in the specification in accordance with a predetermined set of permissions; and responsive to verifying said user in accordance with the predetermined set of permissions, creating a version of the data resource indicated in accordance with the specification for deployment on the software platform for subsequent access or execution by said user.

The method may further comprise, responsive to verifying said user, identifying one or more annotations in the data resource specification, associating an executable launch function appropriate to the or each identified annotation to the created data resource, wherein the launch function, when executed, transmits a data resource identifier to a software platform controller and receives therefrom information necessary for one or more actions to be performed on or by the created data resource.

The software platform controller may further determine that the user has been verified prior to providing the launch function with said information.

The software platform controller may further determine attributes of the user and/or the data resource using the data resource identifier, and, provides said information based on said attributes.

In response to identifying an annotation associated with a security feature, the method may further comprise associating an executable launch function that, when executed, obtains secret information necessary for accessing or executing the data resource when deployed on the software platform.

The secret information may be received from a secure vault, external to the launch function and the software platform controller.

The secret information received from the software platform controller may comprise a wrapped token, and wherein the launch function queries the secure server using the secret information to obtain the secret information.

The secret information may comprise a password and/or a digital certificate.

The said information may define whether the user is permitted to create, edit and/or delete the data resource.

Performing verification may comprise verifying that said user is permitted to create new data resources in accordance with the predefined set of permissions.

The, or a subsequent, user request may comprise an indication that the data resource is required to be accessible to one or more other users, external to the software platform, via a network link, the method further comprising verifying that said user is permitted to allow access to the data resource by external users, and responsive to verifying that said user is so permitted, the method further comprises creating one or more replicas of the data resource, and subsequently routing access requests from one or more external users to the one or more replicas.

The indication that the data resource is required to be accessible to one or more other users may comprise identifying an annotation in the user request associated with said external user access, the method further comprising identifying other user access requests to the data resource by means of a corresponding annotation in the other user requests.

The annotation may be provided in a URL path.

The method may comprise creating a plurality of replicas of the data resource and routing access requests from the one or more other users by means of a load balancing algorithm.

The data resource may be an executable application.

The data resource may be an executable data analysis application.

The data resource may be a database.

The software platform may be a containerised software platform storing and executing multiple data resources for multiple users on multiple host computers.

A second aspect provides a computer program, optionally stored on a non-transitory computer readable medium program which, when executed by one or more processors of a data processing apparatus, causes the data processing apparatus to carry out a method according to any preceding definition.

A third aspect provides an apparatus configured to carry out the method according to any preceding method definition, the apparatus comprising one or more processors or special-purpose computing hardware.

BRIEF DESCRIPTION OF THE DRAWINGS

Example embodiments will now be described by way of non-limiting example with reference to the accompanying drawings, in which:

FIG. 5 is a flow diagram showing processing steps that may be performed by the application represented in FIG. 4 according to embodiments of this specification;

FIG. 6 is a flow diagram showing further processing steps that may be performed by the application represented in FIG. 4 according to embodiments of this specification;

FIG. 9 is a flow diagram showing processing steps that may be performed as part of an ingress control function according to embodiments of this specification.

DETAILED DESCRIPTION OF CERTAIN EMBODIMENTS

Figure 1:
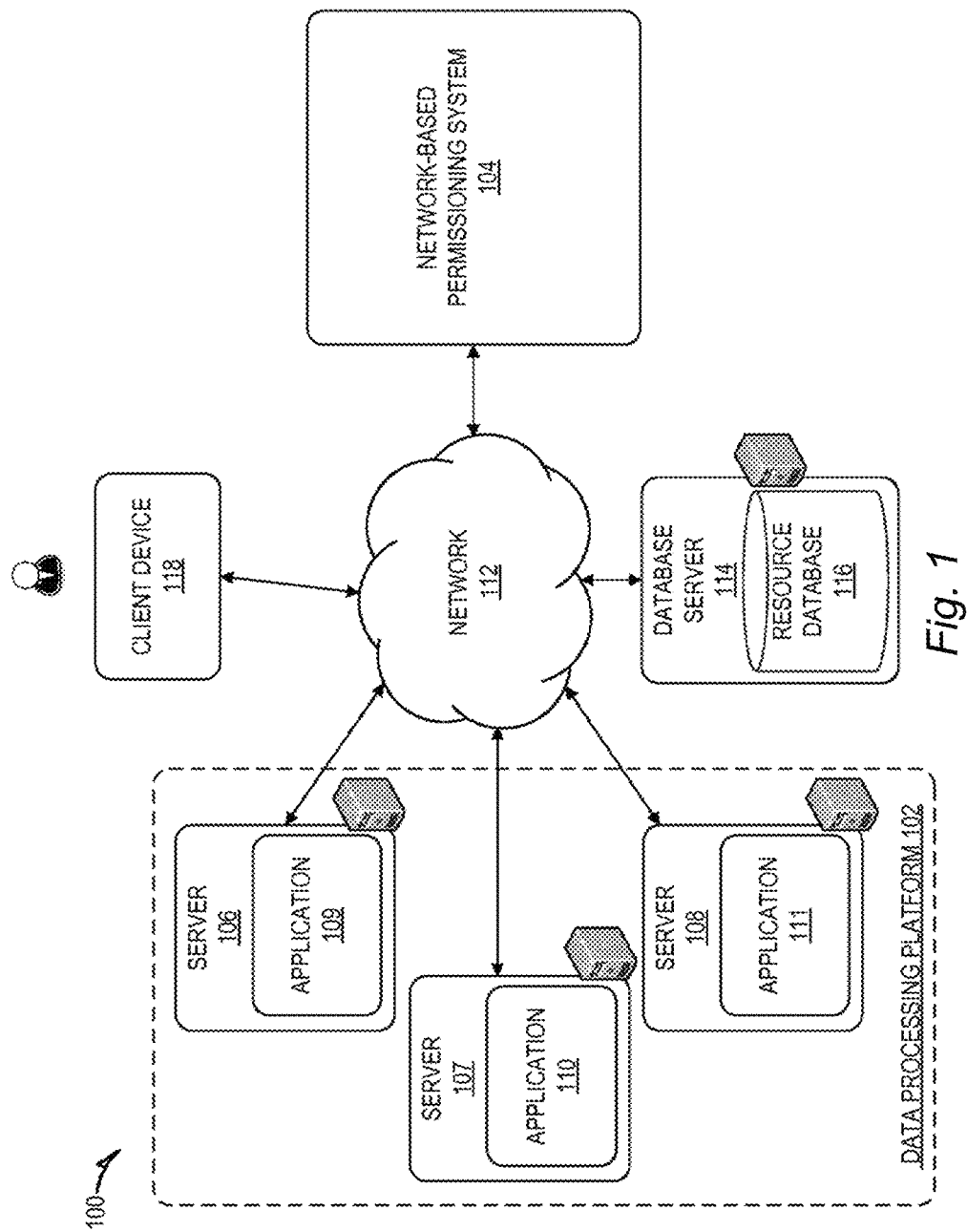
FIG. 1 is a block diagram illustrating a network system comprising a group of application servers of a data processing platform according to embodiments of this specification.

In brief, this specification describes methods and systems for controlling user creation of data resources on a data processing platform suitable for storing and executing data resources for multiple users or sets of users. The data processing platform may, for example, be associated with a cloud computing service, which may provide ubiquitous access to shared pools of servers, storage, computer networks, applications and data resources, which can be rapidly provisioned, often over the Internet.

The methods and systems involve receiving a user request from users, the user request being for creating a data resource on the software platform. The user request may be any appropriate form of data message.

A data resource in this context is any form of executable software or data structure, usually but not exclusively for providing a service, for example a data analysis application, a data transformation application, a report generating application, a machine learning process, a spreadsheet or a database.

The user request may identify the user, which may be a single user or an identifier of their particular client device. The user identifier may be for a group of users. The user identifier may be provided in any suitable form.

The user request may comprise a specification which defines a type of data resource required to be created, and may also define metadata, labels, selectors, comments and annotations. Annotations may be labels, e.g. key-value pairs, that contain non-identifying metadata. Annotations may be added to a specification in order to provide the deployment object with relevant information. For example, an annotation may include a release version, a deployment description, an indication that the data resource needs to run a launch function each time it is run or executed and/or that the data resource needs secret information such as one or more passwords and/or digital certificates each time it is run.

A verification may be performed on said user using the user identifier to determine if said user is permitted to create or modify the data resource indicated in the specification, in accordance with a set of permissions. Thus, if the specification relates to, for example, a database, then the verification may query a predetermined verification policy to determine if the user is permitted to create or access databases.

If verification is performed, the methods and systems may create a version of the data resource based on the specification for deployment on the software platform for subsequent access. The version may be a mutation of a templated version of the data resource, the mutation being particular to the specification and taking account of, for example, any annotations. For example, the mutation may involve associating or attaching a launch function with the created data resource so that the launch function is required to execute before the created data resource is itself run or made accessible to users. In one example, the launch function may obtain secret information from an external vault server. This may be performed every time the data resource is subsequently accessed on the data platform.

The methods and systems therefore provide a robust and secure way of verifying that a user is permitted to create or otherwise access data resources, based on a specification in the user request, and, if verified, then creates a version of the data resource based on the specification, taking account any annotations (if present) in the specification. The verification procedure may make use of external verification functions additional to, or alternatively to, the software platforms own basic verification procedure.

For example, the verification functions may use an external verification policy which defines roles or privilege levels for different users, specifying which functions each user is able to perform, possibly in relation to different types of data resource. In some embodiments, the verification policy may make use of a hierarchical structure, for example by specifying that child nodes from a parent node inherit the parent node's privileges.

The software platform may be an enterprise software platform associated with an enterprise platform provider. An enterprise software platform enables use by multiple users, internal and external to the enterprise platform provider. The users may be users of different respective organisations, such as different commercial companies.

The data resources stored on the software platform may relate to technical data and/or technical processes. For example, an engine manufacturer may create and store a database relating to spare parts for the different models of engines it produces and services. The database may, for example, be a multi-dimensional relational database. Certain analyses may be performed on the database using another application, for example an executable application resource for analysing and/or transforming the data in order to identify trends which may be useful for predicting when certain parts will fail and/or need replacing.

For this purpose, the software platform may comprise enterprise applications for machine-analysis of data resources. For example, an organisation may store on the software platform history data for a machine and use an enterprise application for the processing of history data for the machine in order to determine the probability, or a risk score, of the machine, or a component sub-system of the machine, experiencing a fault during a future interval. The enterprise application may use the fault probabilities or risk scores determined for a machine to select a preventative maintenance task which can reduce the probability and/or severity of the machine experiencing a fault.

History data for a machine may include sensor logs, a sensor log being multiple measurements of physical parameters captured by a sensor and relating to different points in time (a time series). History data for a machine may also include computer readable logs such as maintenance logs, fault logs and message logs corresponding to a machine. The maintenance log corresponding to the machine may record information such as dates and locations of prior maintenance tasks, details of replacement parts, free text notes made by an engineer or mechanic performing a maintenance task and so forth. The fault log corresponding to the machine may record information such as dates and locations of faults, the types of faults, the period of time required to rectify each fault and so forth. The message log corresponding to a machine, such as a ship or construction machinery, and may record messages generated by controllers, processors or similar devices which are integrated into the component sub-systems of the machine. The messages may include a date and time, an identifier of a component sub-system, and message content such as, for example, warning information of information identifying a fault.

The above application is mentioned by way of example.

The software platform on which the data resources are stored and executed may be a proprietary or open source platform, which offers advantages in terms of time-to-deploy on the platform provider's hardware, as well as offering partitioning of data and rolling upgrades. An example open source platform is Kubernetes, which is particularly suited for automated deployment, scaling and management of applications. Such software platforms may employ containerised data resources.

In this regard, a containerised data resource comprises "containers" which hold one or more applications, and associated data libraries, that are guaranteed to be co-located on the same host machine and which can share resources.

Such software platforms may also provide a set of primitives which collectively provide mechanisms for deploying, maintaining and scaling applications. A basic scheduling unit may be called a pod. A pod may consist of one or more containers.

A disadvantage with such software platforms is that they may offer only a basic level of security. For example, there exists the possibility that an application belonging to a first organisation may impact an application or other data resource, belonging to a second organisation which is stored on the same host computer. For example, an organisation that provides different users with different permission rights for different purposes cannot easily implement this level of granularity using such proprietary or open source software platforms. For example, an organisation wishing to create, execute and run one or more enterprise applications stored on a cloud service platform may provide a first set of users with rights to create, execute and edit one or more applications belong to the organisation, and a second set of users with rights only to execute a sub-set of applications, based on their role within the organisation.

Further disadvantages may exist in terms of security-in-transit, that is when secure, secret data such as passwords and certificates need to be securely passed between data resources, particularly those on different hosts, using a secure protocol such as the Secure Sockets Layer (SSL) or Agglomerated SSL (ASSL.)

In general, it may be difficult for different organisations wishing to use such software platforms to be provided with the levels of verification and security they require. Embodiments herein disclose methods and systems by which, for example, a provider of the software platform can provide more robust security to its users in a convenient way.

FIG. 1 is a network diagram depicting a network system 100 comprising a data processing platform 102 in communication with a network-based permissioning system 104 (hereafter "permissioning system") configured for registering and evaluating access permissions for data resources to which a group of application servers 106-108 share common access, according to an example embodiment. Consistent with some embodiments, the network system 100 may employ a client-server architecture, though the present subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

The data processing platform 102 includes a group of application servers, specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyse data to develop various insights about the data, and visualize various metrics associated with the data. To further this example, the network application 109 may be used to analyse data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers and in other embodiments, fewer or additional servers and applications may be included.

The applications 109-111 may be associated with a first organisation. One or more other applications (not shown) may be associated with a second, different organisation. These other applications may be provided on one or more of the application servers 106, 107, 108 which need not be specific to a particular organisation. Where two or more applications are provided on a common server 106-108 (or host), they may be containerised which as mentioned above enables them to share common functions.

Each of the servers 106-108 may in communication with the network-based permissioning system 104 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a separate database server 114. The resource database 116 may stores other data resources that may be used by any one of the applications 109-111 hosted by the data processing platform 102.

In other embodiments, one or more of the database server 114 and the network-based permissioning system 104 may be local to the data processing platform 102; that is, they may be stored in the same location or even on the same server or host as the network applications 109, 110, 111.

As shown, the network system 100 also includes a client device 118 in communication with the data processing platform 102 and the network-based permissioning system 104 over the network 106. The client device 118 communicates and exchanges data with the data processing platform 102

The client device 118 may be any of a variety of types of devices that include at least a display, a processor, and communication capabilities that provide access to the network 106 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more user interfaces (UIs). The UIs may be specifically associated with a web client (e.g., a browser) or an application 109-111 executing on the client device 118 that is in communication with the data processing platform 102. For example, the network-based permissioning system 104 provides user interfaces to a user of the client device 118 (e.g., by communicating a set of computer-readable instructions to the client device 118 that cause the client device 118 to display the user interfaces) that allow the user to register policies associated with data resources stored in the resource database 116.

Figure 2:
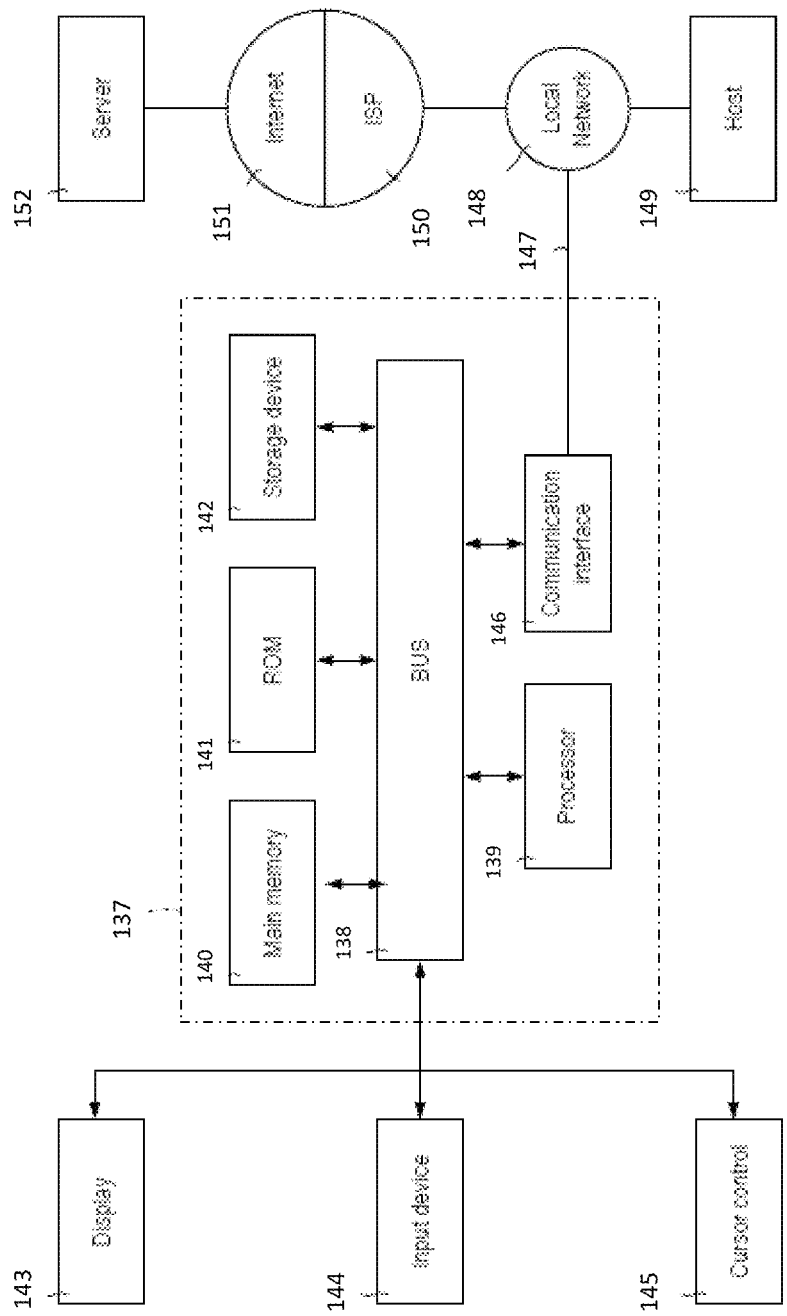
FIG. 2 is a block diagram of a computer system according to embodiments of this specification.

Referring to FIG. 2, a block diagram of an exemplary computer system 137, which may comprise the data processing platform 102, one or more of the servers 106-108, the database server 114 and/or the network-based permissioning system 104, consistent with examples of the present specification is shown.

Computer system 137 includes a bus 138 or other communication mechanism for communicating information, and a hardware processor 139 coupled with bus 138 for processing information. Hardware processor 139 can be, for example, a general purpose microprocessor. Hardware processor 139 comprises electrical circuitry.

Computer system 137 includes a main memory 140, such as a random access memory (RAM) or other dynamic storage device, which is coupled to the bus 138 for storing information and instructions to be executed by processor 139. The main memory 140 can also be used for storing temporary variables or other intermediate information during execution of instructions by the processor 139. Such instructions, when stored in non-transitory storage media accessible to the processor 139, render the computer system 137 into a special-purpose machine that is customized to perform the operations specified in the instructions.

Computer system 137 further includes a read only memory (ROM) 141 or other static storage device coupled to the bus 138 for storing static information and instructions for the processor1 139. A storage device 142, such as a magnetic disk or optical disk, is provided and coupled to the bus 138 for storing information and instructions.

Computer system 137 can be coupled via the bus 138 to a display 143, such as a cathode ray tube (CRT), liquid crystal display, or touch screen, for displaying information to a user. An input device 144, including alphanumeric and other keys, is coupled to the bus 138 for communicating information and command selections to the processor 139. Another type of user input device is cursor control 145, for example using a mouse, a trackball, or cursor direction keys for communicating direction information and command selections to the processor 139 and for controlling cursor movement on the display 143. The input device typically has two degrees of freedom in two axes, a first axis (for example, x) and a second axis (for example, y), that allows the device to specify positions in a plane.

Computer system 137 can implement the techniques described herein using customized hard-wired logic, one or more ASICs or FPGAs, firmware and/or program logic which in combination with the computer system causes or programs computer system 137 to be a special-purpose machine. According to some embodiments, the operations, functionalities, and techniques disclosed herein are performed by computer system 137 in response to the processor 139 executing one or more sequences of one or more instructions contained in the main memory 140. Such instructions can be read into the main memory 40 from another storage medium, such as storage device 142. Execution of the sequences of instructions contained in main memory 140 causes the processor 139 to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device 142. Volatile media includes dynamic memory, such as main memory 140. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus 138. Transmission media can also take the form of acoustic or light waves, such as those generated during radio-wave and infra-red data communications.

Various forms of media can be involved in carrying one or more sequences of one or more instructions to processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to computer system 137 can receive the data on the telephone line or other transmission medium and use an infra-red transmitter to convert the data to an infra-red signal. An infra-red detector can receive the data carried in the infra-red signal and appropriate circuitry can place the data on bus 138. Bus 138 carries the data to the main memory 140, from which the processor 139 retrieves and executes the instructions. The instructions received by the main memory 140 can optionally be stored on the storage device 142 either before or after execution by the processor 139.

Computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As another example, the communication interface 146 can be a local area network (LAN) card to provide a data communication connection to a compatible LAN. Wireless links can also be implemented. In any such implementation, the communication interface 146 sends and receives electrical, electromagnetic or optical signals that carry digital data streams representing various types of information.

The network link 147 typically provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the world wide packet data communication network now commonly referred to as the "Internet" 151. The local network 148 and internet 151 both use electrical, electromagnetic or optical signals that carry digital data streams. The signals through the various networks and the signals on the network link 147 and through the communication interface 146, which carry the digital data to and from the computer system 137, are example forms of transmission media.

The computer system 137 can send messages and receive data, including program code, through the network(s), network link 147 and communication interface 146. For example, a first application server 106 may transmit data through the local network 148 to a different application server 107, 108.

The data processing platform 102 may be a containerised data processing platform.

In this regard, a containerised data platform comprises "containers" which hold one or more applications, and associated data libraries, that are guaranteed to be co-located on the same host machine and which can share resources. Such software platforms may also provide a set of primitives which collectively provide mechanisms for deploying, maintaining and scaling applications. A basic scheduling unit may be called a pod. A pod may consist of one or more containers.

Figure 3:
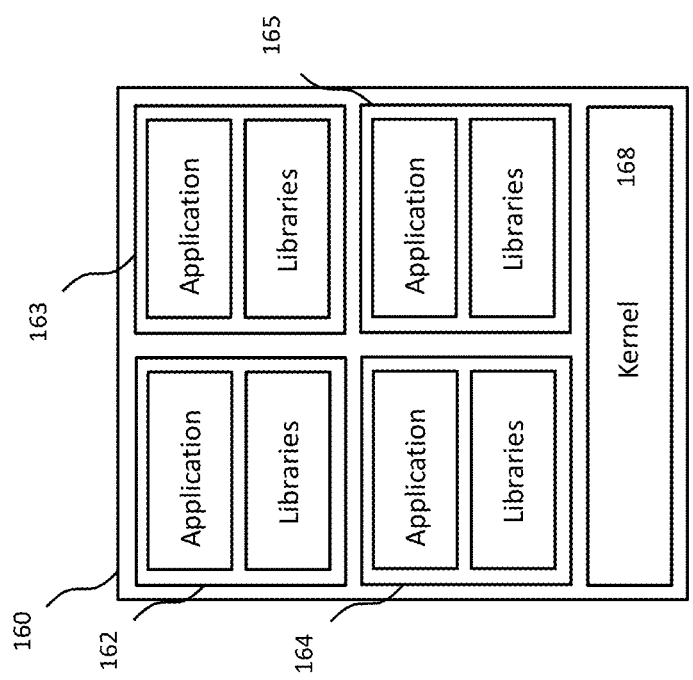
FIG. 3 is a schematic diagram of a container of a containerised computer platform according to embodiments of this specification.

For example, FIG. 3 is a schematic view of a container 160 of a containerised data processing platform. The container 160 in this case comprises first to fourth applications 162, 163, 164, 165, each having an associated library of functions, and a kernel 168. One or more of the first to fourth applications 162-165 may form part of a pod. For example, the first to third applications 162-164 may comprise a first pod and the fourth application 165 may comprise a second pod. For example, the first pod may comprise a first external organisation's applications, whereas the second pod may comprise a second external organisation's applications. Either way, the first and second pods run in the same kernel, in this example.

In accordance with an example embodiment, one of the application servers 106 in the data processing platform 102 shown in FIG. 1 comprises an access control application 109 configured to manage user access to other applications 110, 111 on one or more of the other application servers 107, 108 in accordance with the following. In particular, the access control application 109 controls or manages creation of data resources in a more secure, robust and secure way.

It should be appreciated that the access control application 109 can be configured to manage user access to data resources stored on the same application server 106 and to other forms of data resource, for example stored in the resource database 116 on the database server 114.

Figure 4:
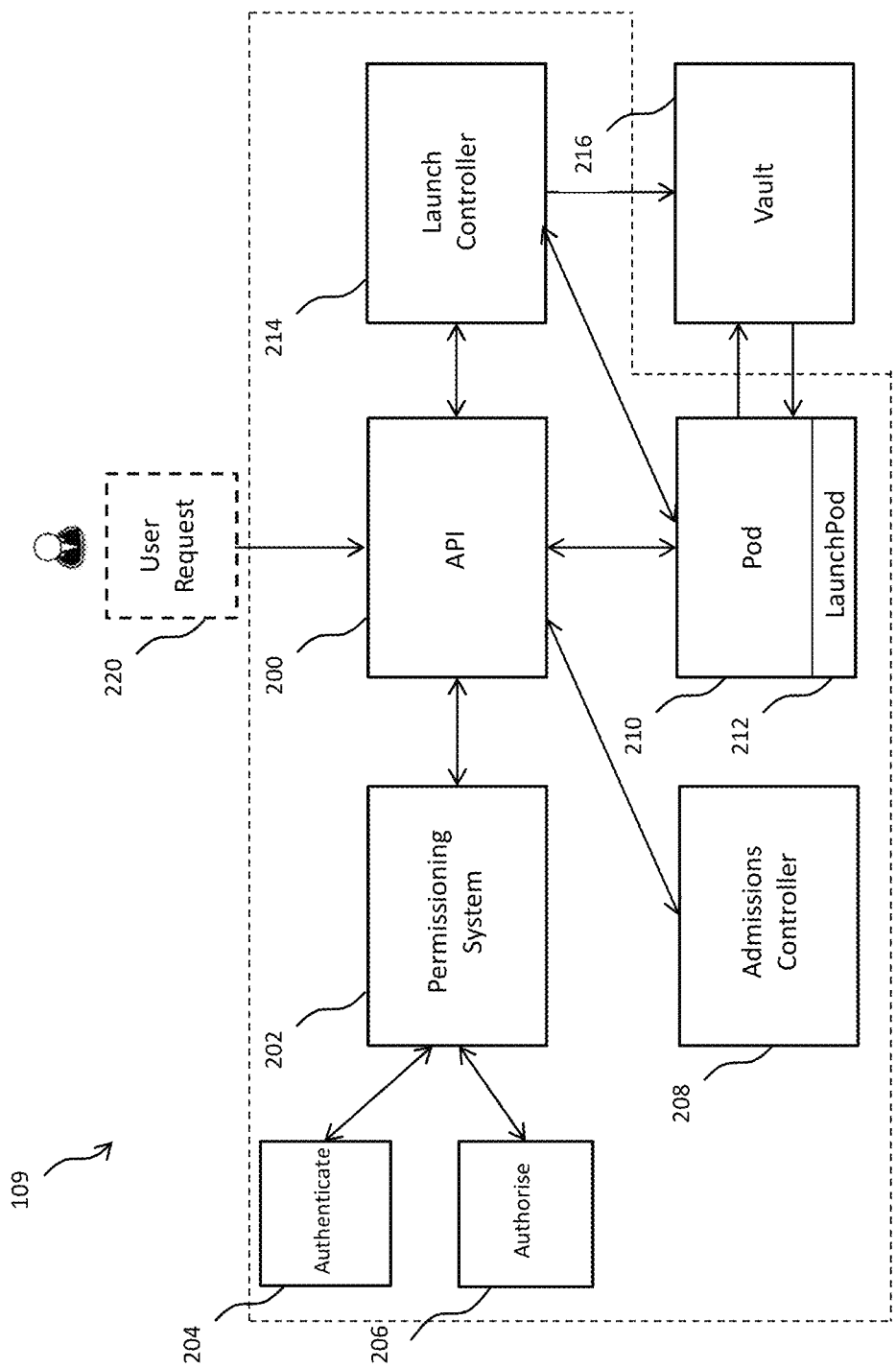
FIG. 4 is a block diagram of functional components of an application for controlling user creation and subsequent access to one or more data resources according to embodiments of this specification.

FIG. 4 is a schematic block diagram of functional components of the access control application 109 and its associated data structures. In other embodiments, the functional components may be arranged as a plurality of separate, interacting applications and data structures. The access control application 109 comprises an application program interface (API) 200, a permissioning module 202, an admissions controller 208, and a launch controller 214.

The authentication and authorisation modules 206, 207 may be provided by separate modules, external to the access control application 109.

The API 200 is arranged to receive user requests 220 from external users, e.g. from the client device 118 shown in FIG. 1, for accessing a data resource, which can include one or more of creating a new application on one or more of the servers 106-109, accessing an existing one of the applications 110, 111, and deleting an existing one of the applications. In the following, the example of creating a new application will be described in further detail.

The user request 220 may typically comprise in data form a user identifier associated with the requesting user, and an indication of the resource, e.g. the application they wish to access, by means of a specification. The specification defines a type of data resource required to be created, and may also define metadata, labels, selectors, comments and annotations. Annotations may be labels, e.g. key-value pairs, that contain non-identifying metadata. Annotations may be added to a specification in order to provide the deployment object with relevant information. For example, an annotation may include a release version, a deployment description, an indication that the data resource needs to run a launch function each time it is run or executed and/or that the data resource needs secret information such as one or more passwords and/or digital certificates each time it is run.

The user request 220 may also indicate in data form the type of access required, e.g. create application. The user request 220 may also indicate in data form the role of said user that issued the user request, although the role may be mapped by the permissioning system 202 based on the user identifier.

The API 200, upon receipt of the user request 220, initially requests verification of the user request by means of the permissioning system 202.

This may be by means of a two-stage process. A first stage may comprise an authentication stage and a second stage may comprise an authorization stage. The two stages may be implemented in separate messages between the API 200 and the permissioning system, or in a combined message.

The permissioning system 202, which may be the network-based permissioning system 104 shown in FIG. 1, is responsive to receiving the verification request from the API 200 to authenticate the user identified in the user request. The verification request from the API 200 to the permissioning system 202 may be an "Authn" message. Authentication in this sense may simply mean verifying that the user that issued the user request 220 is who they say they are. This may be by means of a token-based authentication system, whereby the user is pre-registered with the permissioning system 104 through some prior registration method, such that each time a new user request 220 is issued by the user (from a terminal they are logged into) it is accompanied by a signed token which the permissioning system 202 verifies for authenticity.

The signed token may be of any suitable type, for example a JSON Web Token (JWT).

In other embodiments, verification may be by means of a single sign on (SSO).

The permissioning system 202 may operate in conjunction with the authentication module 204 which authenticates (or denies) the user by checking the authenticity of the SSO, or the signed token, transmitted with the user request 220.

If the user is authenticated by the authentication module 204, a positive authentication message is sent back to the permissioning system 202 which then proceeds to the second stage of verification whereby the user is authorised. If the authentication fails, the authentication module 206 will issue a denial message back to the permissioning system 202 which may then communicate said fact to the user via the API 200 and the process goes no further.

In the second stage, following a positive authentication, the permissioning system 202 communicates an authorisation request to the authorisation module 206. This may be by means of an "Authz" message sent to the authorisation module 206, which may be an Authz platform. The authorisation module 206 answers a different set of questions, such as "what is the identified user able to access?" For example, the user may be a senior developer, as organised through the prior registration method, in which case the user may be granted different access rights than other users having different role(s). For example, a software developer may be able to create, edit/modify, and delete data resources such as applications on the data processing platform 102, data resources on the resource database 116 and so on. On the other hand, another user having a different role, e.g. a junior developer, may have different permissions stored in the authorisation module 206. For example, a junior developer may only be able to create and edit/modify data resources, and not delete data resources.

Thus, the authorisation module 206 may store for the or each organisation registered with the access control application 109 a table or database representing the different organisations, their registered users, and the various roles and associated permissions connected with the roles. These may be defined by each organisation via a prior registration procedure and updated as and when new users join, other users leave, and roles change.

In some examples, certain types of user role may be limited to certain types of data resource. For example, certain roles may be authorised in relation to databases only, applications only, or data resources of a particular category, e.g. related to Project X. Users may also be authorised based on certain annotations, metadata or labels forming part of the data resource specification.

In some examples, users may derive authorisations based on a hierarchical structure. Thus a first node may represent a senior developer that has certain permissions, and all child nodes from the first node may represent other developers in the senior developer's team, or under their control, that may automatically receive the same permissions or a subset thereof.

In this way, a more granular way of authorising requesting users to perform certain accessing functions can be assigned.

The authorisation module 206 may store for the or each organisation a policy object that specifies the operations that each user is authorised to perform with respect to data resources, or a subset of data resources. Further, the policy object may specify one or more further conditions.

Having determined the operations that the requesting user is authorised to perform, the authorisation module 206 returns an authorisation reply, indicating said operations and, if appropriate, further conditions to the permissioning system 202.

The permissioning system 202 subsequently sends the authorisation reply to the API 200. The API 200 subsequently generates and sends to the admissions controller module 208 a data message indicating, for the requesting user: the indication of the data resource they wish to access and the type of access they require (both sets of data being provided in the user request 220) and the authorisation reply or data derived therefrom.

The admissions controller module 208 is arranged to determine if the requesting user is permitted to perform the type of access they require on the indicated data resource based on the authorisation reply.

For example, if the user request 220 comprised a request to create a new database, the user may be authenticated by the authenticate module 204 but, when the "Authz" message is subsequently sent to the authorisation module 206, it may be that the user is only authorised to edit/modify existing databases. In this case, the admissions controller module 208 will receive from the API 200 data indicating that the user wishes to create a new database, but that they are only authorised to edit/modify. In this case, the admission controller module 208 may prevent the user from proceeding with the user request 220.

If the user request 220 is allowed, then a review response is sent from the admissions controller 208, back to the API 200 for it to proceed with the user request 220.

In the case where the user request is for creating a new data resource, for example, version of the data resource is created based on modifying, or mutating, a template of the data resource using the specification in the user request 220. For example, for a new application such as a database application, the API 200 is responsive to the verification instruction from the admissions controller 208 to generate the new database application based on the annotations, labels, metadata and/or any other configuration information in the specification.

In the shown example, the API 200 generates a 'pod' 210 comprised of one or more containerised applications, for which refer to FIG. 3.

Thus, at this point, a new data resource, i.e. the pod 210, has been created only after the user was authenticated and verified for permissions and then the pod itself is created based on the specification initially presented. By passing control of this creation to the API 200 under the control of the admissions controller 208, the access control application 109 can control what is created, by who (provided they have prior permission), and that it meets the specification. The new data resource can be deployed to the software platform at this point, in a trusted way in the knowledge that the data resource conforms to, for example, security requirements of the software platform in terms of verification and the structure of the mutated data resource.

In some examples, the generated pod 210 may have a specification that requires other functions to be performed on the pod when accessed, e.g. when users wish to edit/modify, or execute the pod. This additional functionality may be provided by other data resources, for example a data resource associated with the platform or with another organisation. The other data resource may be external to the platform. The specification may, for example, specify that other data is needed For example, the specification may require that secret information be verified prior to enabling user access to the pod, e.g. to require external users to authenticate themselves before they can then execute, edit and/or access the pod. The secret information may be one or more of a password or digital certificate for protecting data in transit. The secret information may be stored in the vault module 216, which is a secure storage module. The vault module 216 may be external to the access control application 109 in some embodiments, as is indicated in FIG. 4. Thus, it may be appropriate to request and/or receive the secret information over a secure, encrypted link, such as by using SSL or ASSL.

Where other functions are defined in the specification, the API 200 also generates in association with the generated pod 210 a so-called launch function, here referred to as "launchpod" 212. The launchpod 212 is an executable file, tied or otherwise attached to the pod 210, which is required to be executed to initialise the pod 210, and also executed each time the pod 210 is subsequently executed by the data processing platform 102 so that the additional functionality can be provided in accordance with the specification and also to meet the policies and requirements of the software platform itself.

The launchpod 212 automatically sends a launchpod request to the launch controller module 214. The launchpod request indicates the identity of the pod 210 with which it is associated.

Responsive to this, the launch controller module 214 verifies the launchpod 212. The fact that the launchpod 212 could only have been created if the user was verified for the provided specification is an implicit form of verification in this case. The launch controller module 214 then sends a request to the API 200 which returns, based on the launch pod identity, its specification so that the launch controller module can identify the additional functionality required. The launch controller module 214 can then provide the pod 210 with the additional functionality in a secure manner appropriate to the software platform, which may comprise access information.

For example, if the specification indicates that secret data is required, the access information may be a password and/or digital certificate, or data usable to obtain a password and/or digital certificate.

Additionally, or alternatively, the use of a secure link such as by using SSL or ASSL may be appropriate for this function, and therefore a possible requirement of the software platform.

For example, the launch controller module 214 may recognise in accordance with an internal platform policy that, for a specification using an annotation requiring secret information, it is necessary to send a request to the vault module 216 using SSL or ASSL for secret data to be generated for use by the pod 210 subsequently. The vault module 216 may issue a wrapped token, which may be a one-time use token, which is sent to the launch controller module 214 using SSL or ASSL. The launch controller module 214 may then pass the received wrapped token and secret descriptors to the launchpod 212. The launchpod 212 may then obtain the secret information by directly sending the wrapped token and secret descriptors to the vault module 216 over SSL or ASSL. The vault module 216 may subsequently pass the secret information to the launchpod 212 directly based on the wrapped token and secret descriptors. Again, this is performed over SSL or ASSL.

Thus, the launch controller module 214 acts as a trusted intermediary between a launchpod 212 for obtaining the verified data resource specification for the user, and implementing additional functionality in accordance with the data platform's policies. For example, by recognising that secret information is required to access the data resource, the launch controller module 214 can implement this each time the data resource is accessed (causing the launchpod 212 to be executed) by using a secure link to communicate with the vault module 216.

In overview, the above methods and systems provide a form of 'bootstrapping' to impose controls on how data resources are newly created and subsequently accessed, and thus avoids data resources detrimentally impacting other data resources which may be due to inexperience or malicious intent.

FIG. 5 is a generalised flow diagram of processing operations that may be performed by the FIG. 2 processor 139 in running the access control application 109.

A first operation 5.1 comprises receiving a user request including a user identifier and a specification of a data resource. A second operation 5.2 comprises verifying the user based on their user identifier and the requested data resource. A third operation 5.3 comprises, responsive to verification, creating a version of the requested data resource in accordance with the specification.

FIG. 6 is a generalised flow diagram of further processing operations that may be performed by the FIG. 2 processor 139 in running the access control application 109.

A first operation 6.1, which may directly follow operation 5.3, comprises identifying one or more annotations in the specification of the requested data resource. A second operation 6.2 may comprise associating a launch function to the created version of the data resource. A third operation 6.3 may comprise executing the launch function to transmit a data resource identifier to a controller module. A fourth operation 6.4 may comprise receiving from the controller module access information necessary for performing one or more tasks on the created data resource.

It will be appreciated that certain ones of the above operations may be re-ordered, performed in parallel, and/or omitted. Certain other operations may be added.

Figure 7:
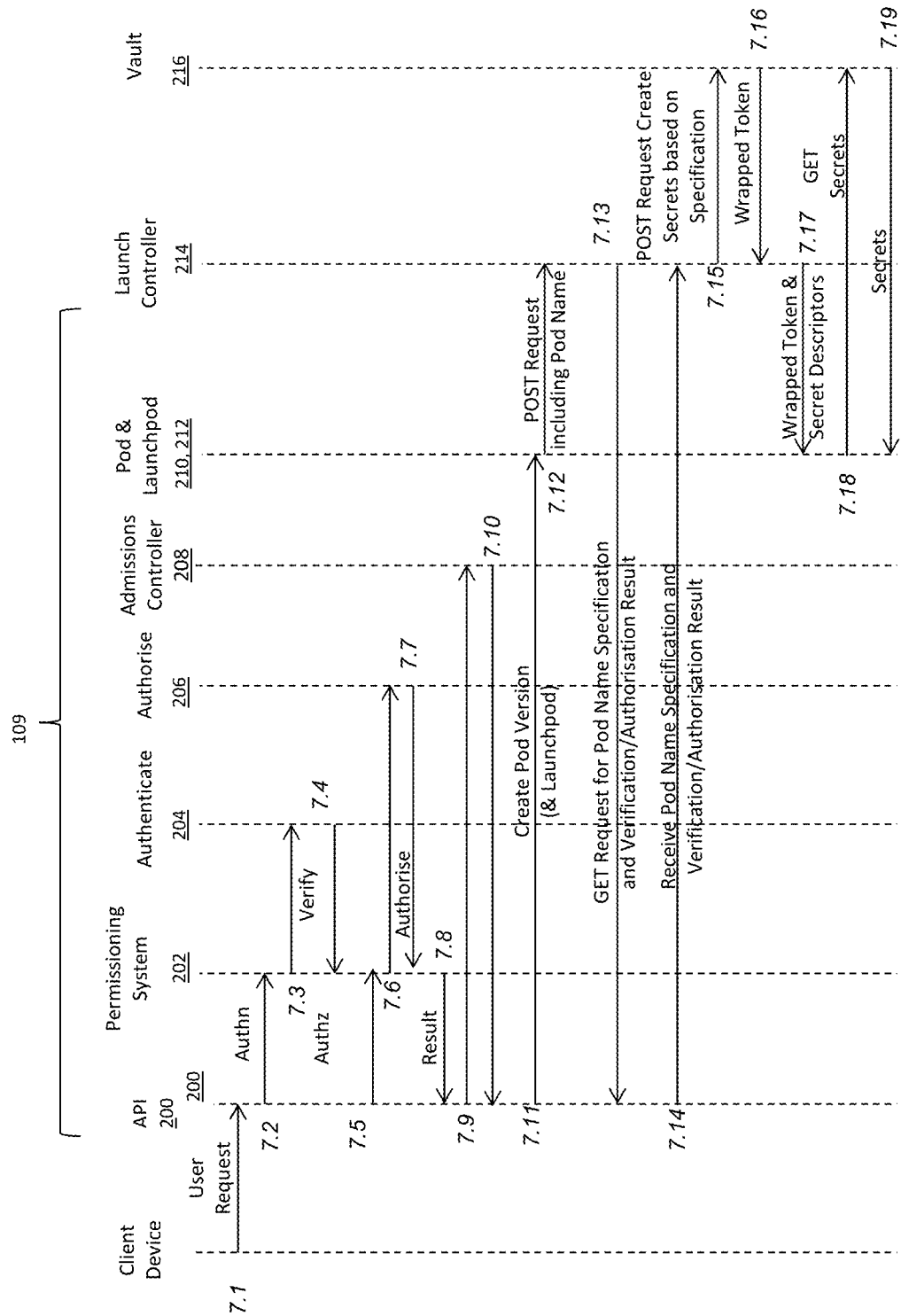
FIG. 7 is a timing diagram showing for a specific example relative timings of data messages between the components represented in FIG. 4 according to embodiments of this specification.

For completeness, FIG. 7 is a data timing diagram which indicates, for a more specific example, the relative timings of data messages between the modules shown in FIG. 4. We refer to the example introduced previously whereby a user wishes to create a new data resource, or "pod", which requires secret information each time it is accessed via the software platform subsequently.

A first operation 7.1 comprises the API 200 receiving a user request.

A second operation 7.2 comprises the API 200 sending an Authn request, e.g. a token review request, to the permissioning system 202.

A third operation 7.3 comprises the permissioning system 202 sending a verify token message to the authentication module 204.

A fourth operation 7.4 comprises the permissioning system 202 receiving a verify (or deny) response from the authentication module 204.

A fifth operation 7.5 comprises the API 200 sending an Authz request, e.g. a subject review request, to the permissioning system 202.

A sixth operation 7.6 comprises the permissioning system 202 sending an authorise user message to the authorisation module 206.

A seventh operation 7.7 comprises the permissioning system 202 receiving an authorise response from the authorisation module 206, indicating the permissions that the user has.

An eighth operation 7.8 comprises comprises the permissioning system 202 providing a result to the API 200 indicative that the user is authenticated and the permissions they have.

A ninth operation 7.9 comprises the API 200 providing the users permissions and at least part of the user resource specification to the admissions controller 208.

A tenth operation 7.10 comprises the admissions controller 208 determining if the user is permitted to perform the function(s) indicated in the user resource specification based on their permissions, e.g. to create a new database in container X. This determination is provided to the API 200.

If permitted, in an eleventh operation 7.11, the API 200 creates a pod 210 for the requested data resource based on a template and information in the specification for the user. If the specification indicates that one or more further functions are required, the API 200 also creates a launchpod 212 which is associated with the created pod 210.

In a twelfth operation 7.12, the launchpod 212 sends a POST request to the launch controller 214, including the name of the pod 210.

In a thirteenth operation 7.13, the launch controller 214 sends a GET request to the API 200 for the specification associated with the pod 210. The GET request may also request the verification result.

In a fourteenth operation 7.14, the API 200 sends the pod specification (and verification result, if needed) to the launch controller 214.

In a fifteenth operation 7.15, the launch controller 214, upon recognising that the launchpod requests secrets (such as one or more passwords or digital certificates) sends a POST request to the secure vault 216 for it to create secrets for the pod 210.

In a sixteenth operation 7.16, the launch controller 214 receives access information in the form of a wrapped token from the secure vault 216, together with secret descriptors.

In a seventeenth operation 7.17, the launch controller 214 sends the wrapped token and secret descriptors to the launchpod 212.

In an eighteenth operation 7.18, the launchpod 212 directly requests secrets from the secure vault 216 using the wrapped token and secret descriptors.

In a nineteenth operation 7.19, the launched 212 receives the requested secrets (provided the wrapped token and secret descriptors are valid) from the secure vault 216.

It will be appreciated that certain ones of the above operations may be re-ordered, performed in parallel, and/or omitted. Certain other operations may be added.

The above-described steps of verification and execution of the launch function may also be performed for subsequent accessing steps, for example for a different user to execute, edit/modify or delete the created data resource, provided they have the appropriate permissions.

Ingress Control

In another embodiment, where it is defined in the data resource specification that external user access to the created data resource is needed, for example by means of an Internet connection (which may be over an unpredictable or insecure link), one or more further modules of the access control application 109 may be arranged to route external requests to the data resource in a secure way.

For example, an annotation "path=foo" may be identified in the data resource specification, which may define a path "example.domain.com.ssp/path=foo" enabling IP access to a data resource named "foo".

In this situation, the access control application 109 is arranged to create one or more replicas (copies) of the data resource, and, upon receiving a subsequent external request using the path, routes the request to the replica, or one of the replicas, instead of the original version. This avoids corruption of the original version by external traffic, which may originate from a malicious source.

Where a plurality of replicas is provided, this routing may also be performed via one or more load balancers, to ensure that multiple requests are distributed appropriately to the replicas in accordance with a load balancing algorithm.

The access control application 109 may provide a so-called ingress controller for this purpose.

Figure 8:
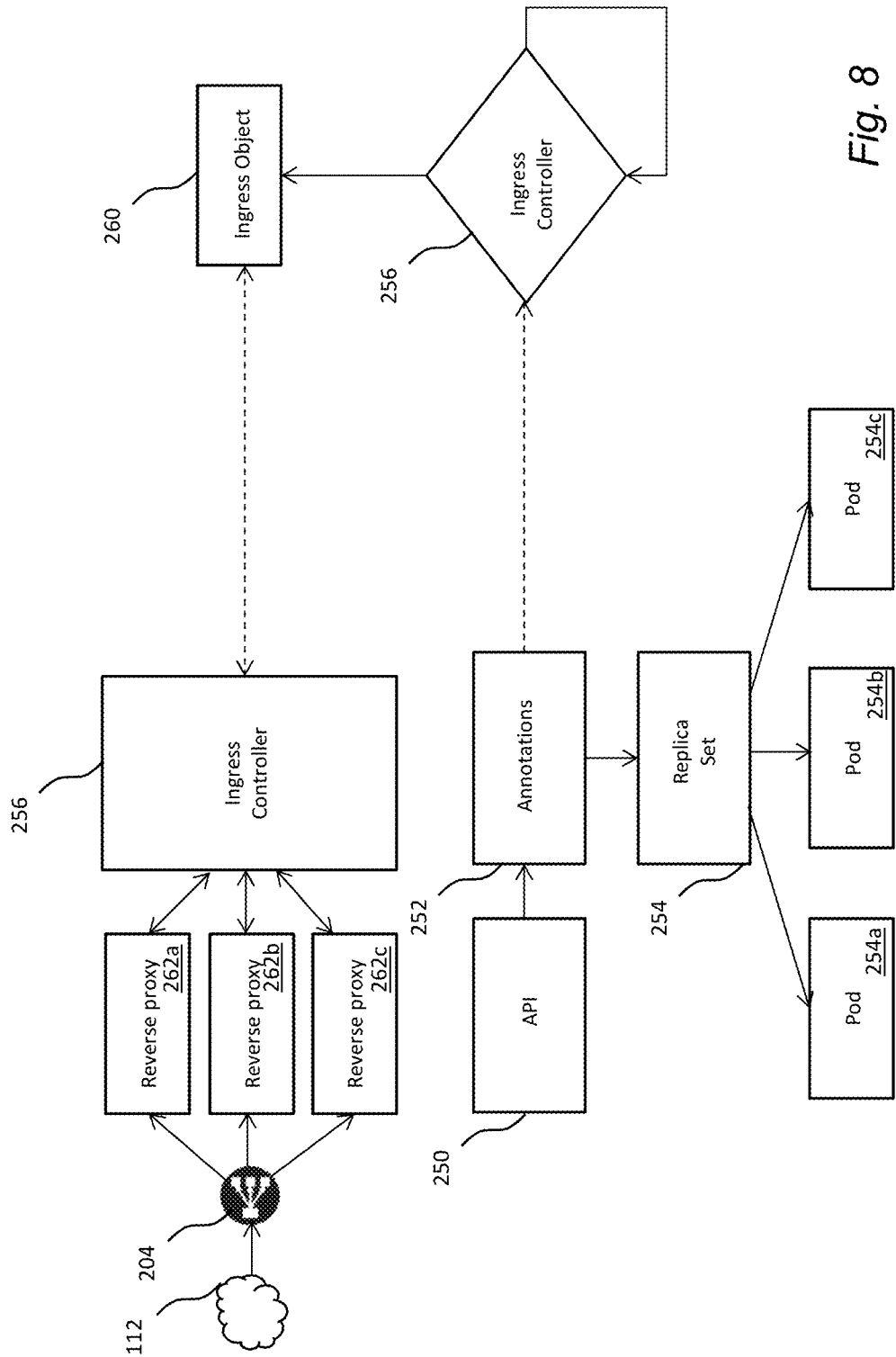
FIG. 8 is a schematic diagram of functional components of an application for controlling the ingress of access requests for one or more data resources of a data processing platform according to embodiments of this specification.

FIG. 8 is a schematic diagram, showing functional operations and interactions of the access control application 109 for performing ingress control according to an example embodiment.

An API 250, which may the API 200 shown in FIG. 4, creates a service resource called in this case "Annotations" 252. The annotations service resource 252 may comprise one or more annotations which, in a data resource specification, correspond to an externally accessible service. For example, the annotation "path=foo" may be identified as being externally accessible.

A replica set 254 of the data resource may be created by the API 250, in this case comprising first to third replicas 254a, 254b, 254c.

An ingress controller 256, upon noting that the annotations service resource 252 was created for "path=foo" then creates another service resource 260 called ingress object 260, which has the path "path=foo".

The ingress controller 256 also monitors incoming traffic, e.g. via the network 112, to identify a URL having the annotation, e.g. "example.domain.com.ssp/path=foo." Responsive to this, the external request is routed to one of the replica data resources 254a, 254b, 254c. This routing may also be performed via one or more load balancers 204, to ensure that multiple requests are distributed appropriately to the replicas 254*a*, 254*b*, 254*c* in accordance with a load balancing algorithm. The routing may be performed by a reverse proxy 262*a-c*, for example an NGINX pod. The reverse proxy 262*a-c* is configured by the ingress controller 256 upon recognition of an ingress object 260 to route incoming traffic to the replica resources 252*a-c*.

FIG. 9 is a generalised flow diagram of processing operations that may be performed by the FIG. 8 API 250 in co-operation with the ingress controller 256 of the access control application 109.

A first operation 9.1 may comprise identifying a data resource requiring access by external users.

A second operation 9.2 may comprise creating one or more replicas of the data resource.

A third operation 9.3 may comprise routing access requests by external users to the one or more replicas.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicant hereby gives notice that new claims may be formulated to such features and/or combinations of such features during the prosecution of the present application or of any further application derived therefrom.

What is claimed is:

1. A method comprising:
   receiving from a user a user request to create a data resource on a software platform, the user request comprising, or identifying, a specification indicative of the data resource and a user identifier;
   creating a version of the data resource indicated in accordance with the specification for deployment on the software platform for subsequent access or execution by said user;
   identifying one or more annotations in the data resource specification;
   in response to identifying an annotation associated with a security feature, associating, to the created data resource, an executable launch function that, when executed, obtains secret information necessary for accessing or executing the data resource when deployed on the software platform, wherein the launch function, when executed, transmits a data resource identifier to a software platform controller and receives therefrom information necessary for one or more actions to be performed on or by the created data resource;
   the software platform controller determining one or more of metadata of the data resource, labels of the data resource, selectors of the data resource, comments of the data resource, a release version of the data resource, a deployment description of the data resource, a role of the user, a privilege level of the user, or one or more permissions of the user.

2. The method of claim 1, further comprising:
   identifying one or more other annotations in the data resource specification;
   associating, to the created data resource, an executable launch function appropriate to each of the identified annotations, wherein the launch function, when executed, transmits a data resource identifier to a software platform controller and receives therefrom information necessary for one or more actions to be performed on or by the created data resource.

3. The method of claim 2, wherein the said information defines whether the user is permitted to create, edit and/or delete the data resource.

4. The method of claim 1, wherein the secret information is received from a secure vault, external to the launch function and the software platform controller.

5. The method of claim 4, wherein the secret information received from the software platform controller comprises a wrapped token, and wherein the launch function queries the secure vault using the secret information to obtain the secret information.

6. The method of claim 4, wherein the secret information comprises a password and/or a digital certificate.

7. The method of claim 1, wherein the user request comprises an indication that the data resource is required to be accessible to one or more other users, external to the software platform, via a network link, the method further comprising:
   verifying that said user is permitted to allow access to the data resource by external users;
   responsive to verifying that said user is so permitted, creating one or more replicas of the data resource, and subsequently routing access requests from one or more external users to the one or more replicas.

8. The method of claim 7, wherein the indication that the data resource is required to be accessible to one or more other users comprises identifying an annotation in the user request associated with said external user access, the method further comprising:
   identifying other user access requests to the data resource by means of a corresponding annotation in the other user requests, the annotation optionally being a URL path.

9. The method of claim 7, further comprising creating a plurality of replicas of the data resource and routing access requests from the one or more other users by means of a load balancing algorithm.

10. A computer system comprising:
    one or more processors;
    one or more non-transitory computer-readable storage media coupled to the one or more processors and storing one or more sequences of instructions which when executed cause performing:
    receiving from a user a user request to create a data resource on a software platform, the user request comprising, or identifying, a specification indicative of the data resource and a user identifier associated with an external user;
    creating a version of the data resource indicated in accordance with the specification for deployment on the software platform for subsequent access or execution by said user;
    identifying one or more annotations in the data resource specification;
    in response to identifying an annotation associated with a security feature, associating, to the created data resource, an executable launch function that, when executed, obtains secret information necessary for accessing or executing the data resource when deployed on the software platform, wherein the launch function, when executed, transmits a data resource identifier to a software platform controller and receives therefrom information necessary for one or more actions to be performed on or by the created data resource;

the software platform controller determining one or more of: metadata of the data resource, labels of the data resource, selectors of the data resource, comments of the data resource, a release version of the data resource, a deployment description of the data resource, a role of the user, a privilege level of the user, or one or more permissions of the user.

11. The system of claim 10, wherein the instructions, when executed, further cause performing:
identifying one or more other annotations in the data resource specification;
associating, to the created data resource, an executable launch function appropriate to each of the identified annotations, wherein the launch function, when executed, transmits a data resource identifier to a software platform controller and receives therefrom information necessary for one or more actions to be performed on or by the created data resource.

12. The system of claim 11, wherein the said information defines whether the user is permitted to create, edit and/or delete the data resource.

13. The system of claim 10, wherein the secret information is received from a secure vault, external to the launch function and the software platform controller.

14. The system of claim 13, wherein the secret information received from the software platform controller comprises a wrapped token, and wherein the launch function queries the secure vault using the secret information to obtain the secret information.

15. The system of claim 13, wherein the secret information comprises a password and/or a digital certificate.

16. The system of claim 10, wherein the user request comprises an indication that the data resource is required to be accessible to one or more other users, external to the software platform, via a network link, and wherein the instructions, when executed, further cause performing:
verifying that said user is permitted to allow access to the data resource by external users;
responsive to verifying that said user is so permitted, creating one or more replicas of the data resource, and subsequently routing access requests from one or more external users to the one or more replicas.

17. The system of claim 16, wherein the indication that the data resource is required to be accessible to one or more other users comprises identifying an annotation in the user request associated with said external user access, and wherein the instructions, when executed, further cause performing:
identifying other user access requests to the data resource by means of a corresponding annotation in the other user requests, the annotation optionally being a URL path.

18. The system of claim 16, wherein the instructions, when executed, further cause performing: creating a plurality of replicas of the data resource and routing access requests from the one or more other users by means of a load balancing algorithm.

* * * * *